Patented Oct. 15, 1940

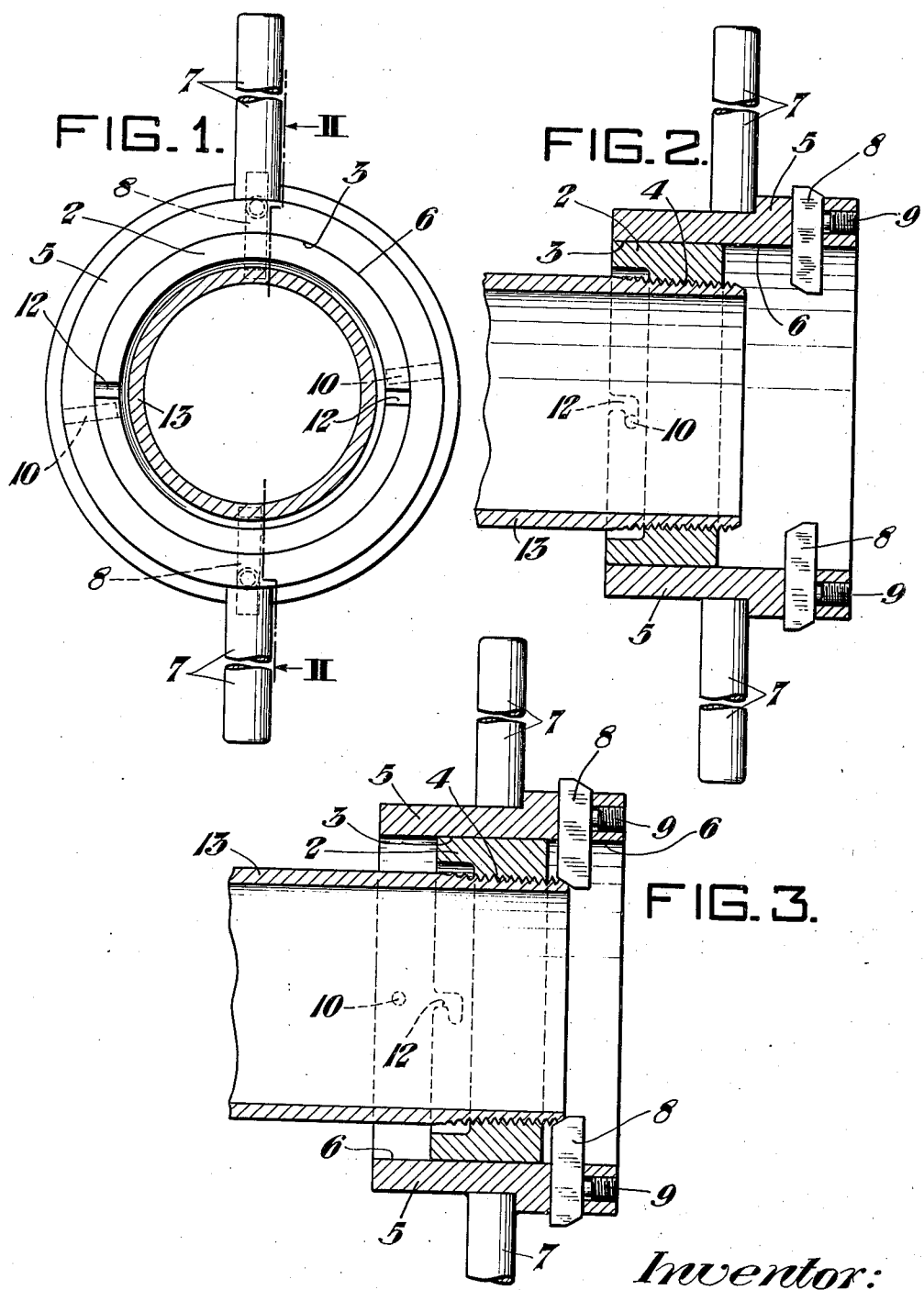

2,218,147

UNITED STATES PATENT OFFICE 2,218,147

CHAMFERING TOOL

George C. Greenwood, Lorain, Ohio, assignor to National Tube Company, a corporation of New Jersey Application March 28, 1939, Serial No. 264,628

3 Claims. (Cl. 82—4)

This invention relates to a cutting device, and, more particularly, to an improved portable cutting tool for chamfering the ends of tubular metallic articles such as tubes, pipes and the like.

It is desirable that lengths of metallic tubes, pipes, etc. be furnished with chamfered end portions, and especially pipes having threaded portions on the ends thereof, for the purpose of aiding in connecting the lengths together and to eliminate any sharp edges on the ends thereof. The ends of such pipes or tubes are usually threaded and chamfered at the point of manufacture, and oftentimes these chamfered ends become damaged during the subsequent handling and shipping thereof. It is therefore desirable that these ends be rechamfered and reconditioned at the point of use and it is to an improved tool for reconditioning these ends that the present invention refers.

It is one of the objects of the present invention to provide a simple and inexpensive improved portable tool for chamfering the ends of pipes or tubes which can be easily and conveniently used and operated manually.

It is another object of the invention to provide an improved tool which will not only chamfer the ends of the pipe but, at the same time, will tend to recondition the threads on the ends thereof.

It is a further object of this invention to provide an improved portable tool for chamfering the ends of tubular articles which is adjustable, and one that will accurately and efficiently recondition the same with a minimum amount of waste and effort.

Various other objects and advantages of this invention will be more apparent in the course of the following specification and will be particularly pointed out in the appended claims.

In the accompanying drawing there is shown, for the purpose of illustration, one embodiment which my invention may assume in practice.

In the drawing:

Figure 1 is a rear end view of the improved chamfering tool of my invention showing it assembled on the end of a pipe;

Figure 2 is a section taken on the line II—II of Figure 1; and

Figure 3 is a vertical section through the same, similar to Figure 2, showing my improved chamfering tool in operating position.

Referring more particularly to the drawing, the improved portable cutting device or tool of my invention comprises an annular guide member 2 having a smooth outer face 3 and an internally threaded portion 4 which is adapted to be screwed on the threaded end of the tube or pipe with which it is to be used. There is disposed around the annular guide member 2, a rotatable annular sleeve-like member 5 having a smooth inner surface 6 which is adapted to contact the outer smooth surface 3 of the annular guide member 2 and has preferably a sliding fit therewith. There is arranged on the outer face of the sleeve-like member 5 and extending outwardly therefrom, a pair of oppositely disposed handles 7 preferably positioned intermediate the length of the sleeve-like member 5.

There is also arranged on the sleeve-like member 5, adjacent the outer edge thereof and extending thereinto, a pair of oppositely disposed cutting tools 8 which are adjustably held therein preferably by means of set-screws 9 arranged in the outer edge of the member 5. It will be understood, however, that any number of cutting tools may be similarly arranged therein as desired or a single cutting tool may suffice.

There is also positioned on the sleeve-like member 5, preferably toward the inner end thereof, a pair of inwardly extending oppositely disposed pins 10 which are adapted to cooperate and engage with L-shaped slots 12 arranged in the inner edge of the annular guide member 2 for a purpose hereinafter to be described. It will be understood, however, that any suitable disengageable connecting means may be employed for connecting the sleeve-like member 5 and the guide member 2 together in place of the pin and slot arrangement shown.

In operation, the annular guide member 2 is first positioned against the threaded end of a pipe 13 or the pipe on which it is to be used and the same started to be screwed in engagement with the threads thereon. The annular sleeve-like member 5 is then arranged on the guide member 2 so that the pins 10 are in engagement with the L-shaped slots 12 therein so as to temporarily connect the members 5 and 2 together. The entire device is then manually rotated by means of the handles 7 until the guide member 2 is screwed securely onto the threads and arranged tightly thereon.

After the annular guide member 2 is seated firmly on the threaded portion of the pipe, the sleeve-like member 5 is moved inwardly so that the pins 10 are disengaged from the slots 12 thereby disconnecting the sleeve-like member 5 and the guide member 2 so that the sleeve-like member 5 will freely rotate thereon. The cutting tools 8 in the sleeve-like member 5 are then adjusted to position by means of the set-screws 9 so that they will be in proper cutting position in relation to the end of the pipe so as to properly cut the desired chamfered surfaces thereon. The sleeve-like member 5 is then moved further inwardly until the cutting edges of the tools 8 contact the end of the pipe. The sleeve-like member 5 together with the tools 8 is then rotated manually by means of the handles 7 and, at the same time, forcing the sleeve-like member 5 inwardly so that the cutting tools 8 cut the desired chamfer on the end of the pipe upon rotation thereof.

After a chamfer has been cut on the end of the pipe and it is desired to remove the device therefrom, the sleeve-like member 5 is moved outwardly and arranged so that the pins 10 again engage with the L-shaped slots 12 in the guide member 2. The entire device is then rotated in the opposite direction by means of the handles 7, thereby removing the annular guide member 2 and the device from the end of the pipe.

It will be seen that my improved cutting device or tool not only chamfers the end of the pipe 13 but the threaded portion 4 of the guide member 2 tends to recut the threads on the end of the pipe, thereby reconditioning the same.

As a result of my invention, it will be seen that the threaded ends of pipes may be easily and quickly reconditioned after the shipment thereof and just before use without cutting off the threaded portion and rethreading the pipe, as is sometimes necessary. It will thus be seen the improved device of my invention not only saves time but eliminates waste and the need for any expensive threading dies and equipment at the point of use.

While I have shown and described one embodiment of my invention, it will be understood that this embodiment is merely for the purpose of illustration and description and that various other forms may be devised within the scope of my invention, as defined in the appended claims.

I claim:

1. A device of the class described comprising, in combination, an annular guide member having an internal threaded portion by which it is adapted to be positioned and held on the threaded end portion of a tubular work-piece, an annular sleeve-like member rotatably mounted around said guide member telescoping the same, a pair of inwardly extending pins carried by said sleeve-like member, said guide member having a pair of slots arranged therein for receiving said pins so as to disengageably connect said guide member and said sleeve-like member together thereby preventing rotation thereof relative to each other, at least a pair of cutting tools arranged on said sleeve-like member for chamfering the end of the tubular work-piece, and handles arranged on said sleeve-like member for manually rotating the same on said guide member.

2. A device of the class described comprising, in combination, an annular guide member having an outer smooth circumferential surface therearound and an internal threaded portion by which it is adapted to be positioned and securely held on the threaded end portion of the tubular member to be chamfered, an annular sleeve-like member having a smooth inner surface loosely mounted for rotation around said guide member and telescoping the same, said annular guide member having an outer diameter slightly smaller than the inner diameter of said annular sleeve-like member so that the smooth surfaces of each bears against each other, means for disengageably connecting said guide member and said sleeve-like member together in one position so as to prevent rotation thereof relative to each other, cutting means carried by said sleeve-like member for chamfering the end of the tubular member upon rotation of said annular sleeve-like member, and means for rotating said sleeve-like member around said guide member.

3. A device of the class described comprising, in combination, an annular guide member having an outer smooth circumferential surface therearound, means for securely holding said annular guide member on the end of a tubular member to be chamfered, an annular sleeve-like member having a smooth inner surface loosely mounted for rotation around said annular guide member and telescoping the same, said annular guide member having an outer diameter slightly smaller than the inner diameter of said sleeve-like member so that the smooth surfaces of each bears against each other, cutting means carried by said sleeve-like member for chamfering the end of the tubular member upon rotation of said sleeve-like member, and means for rotating said sleeve-like member around said guide member.

GEORGE C. GREENWOOD.